(12) United States Patent
Showalter

(10) Patent No.: US 9,657,837 B2
(45) Date of Patent: May 23, 2017

(54) SPRING LOADED SHIFT ACTUATOR ASSEMBLY HAVING A RETAINING MECHANISM

(71) Applicant: BorgWarner Inc., Auburn Hills, MI (US)

(72) Inventor: Dan J. Showalter, Plymouth, MI (US)

(73) Assignee: BorgWarner Inc., Auburn Hills, MI (US)

( * ) Notice: Subject to any disclaimer, the term of this patent is extended or adjusted under 35 U.S.C. 154(b) by 276 days.

(21) Appl. No.: 14/576,371

(22) Filed: Dec. 19, 2014

(65) Prior Publication Data

US 2015/0176708 A1    Jun. 25, 2015

Related U.S. Application Data

(60) Provisional application No. 61/918,834, filed on Dec. 20, 2013.

(51) Int. Cl.
*F16H 63/36*    (2006.01)
*F16H 63/30*    (2006.01)
(Continued)

(52) U.S. Cl.
CPC ............ *F16H 63/36* (2013.01); *F16H 61/08* (2013.01); *F16H 63/304* (2013.01); *F16H 63/34* (2013.01); *F16H 2063/3063* (2013.01); *F16H 2063/3089* (2013.01); *F16H 2063/321* (2013.01); *Y10T 74/19251* (2015.01); *Y10T 74/2003* (2015.01); *Y10T 74/20098* (2015.01)

(58) Field of Classification Search
CPC ........ F16H 63/36; F16H 61/08; F16H 63/304; F16H 63/34; F16H 2063/321; F16H 2063/3089; F16H 2063/3063; Y10T 74/20098; Y10T 74/19251; Y10T 74/2003
USPC ...................................................... 74/473.37
See application file for complete search history.

(56) References Cited

U.S. PATENT DOCUMENTS 796,828 A    8/1905   Dyer
2,671,351 A    3/1954   Neracher
(Continued)

FOREIGN PATENT DOCUMENTS

DE     10051218 A1     4/2002
DE   102008000635 A1   9/2009
GB       1137193      12/1968

OTHER PUBLICATIONS

Apr. 22, 2015 European Search Report for EP App. No. 14196617.6-1755.

*Primary Examiner* — Victor MacArthur
(74) *Attorney, Agent, or Firm* — Howard & Howard Attorneys PLLC

(57) ABSTRACT

The present invention is directed toward a shift actuator assembly that includes a housing having a retaining mechanism. A holding pawl is biased into engagement with the retaining mechanism. A solenoid releasably engages the pawl when the shift shaft is disposed in its first position such that once the solenoid disengages the pawl, the cam surfaces on the retaining mechanism cooperate with the holding surfaces on the pawl to drive the pawl out of engagement with the retaining mechanism thereby releasing the biasing force of the biasing mechanism to drive the housing and the shift fork axially on the shift shaft between engaged and disengaged positions with respect to the associated gear set.

20 Claims, 5 Drawing Sheets

(51) Int. Cl.
*F16H 63/34* (2006.01)
*F16H 61/08* (2006.01)
*F16H 63/32* (2006.01)

(56) References Cited

U.S. PATENT DOCUMENTS

| | | |
|---|---|---|
| 3,122,936 A | 3/1964 | Dykes |
| 4,449,416 A | 5/1984 | Huitema |
| 4,619,151 A | 10/1986 | Trachman et al. |
| 4,745,822 A | 5/1988 | Trachman et al. |
| 5,179,868 A * | 1/1993 | Thibeault ............... B60R 25/06 70/248 |
| 5,704,444 A | 1/1998 | Showalter |
| 5,878,624 A | 3/1999 | Showalter et al. |
| 5,884,526 A | 3/1999 | Fogelberg |
| 6,173,624 B1 | 1/2001 | Decker |
| 6,619,153 B2 | 9/2003 | Smith et al. |
| 6,830,142 B2 | 12/2004 | Weilant |
| 7,101,304 B2 | 9/2006 | Swanson et al. |
| 7,316,304 B2 | 1/2008 | Heravi et al. |
| 7,506,559 B2 | 3/2009 | Swanson et al. |
| 2002/0139215 A1* | 10/2002 | Smith ..................... F16H 63/32 74/473.37 |
| 2007/0175286 A1 | 8/2007 | Oliveira et al. |

\* cited by examiner

SPRING LOADED SHIFT ACTUATOR ASSEMBLY HAVING A RETAINING MECHANISM

BACKGROUND OF INVENTION

1. Field of Invention

The present invention relates, generally, to shift actuators for operatively engaging and disengaging associated gear sets, and more specifically, to spring loaded shift actuator having a retaining mechanism for controlling shifts in transmissions, transfer cases and other disconnect systems for four-wheel drive couplings and the like.

2. Description of the Related Art

In both early and many modern transmissions and transfer cases, shifts between various speed ranges and operating conditions are often achieved by a manual linkage controlled by the vehicle operator. Frequently, such linkages include one, or a plurality of, parallel shift rails which may be translated out of a center, neutral position to a forward or rearward position to select a given gear or operating mode.

In contemporary consumer products such as sport utility vehicles and light and medium duty trucks, gear range and operating modes in transfer cases are now more commonly selected through the agency of an electric-mechanical, pneumatic of hydraulic operator. A variety of drive assemblies and intermediate linkages have been developed to achieve range selection and transfer case operating more, e.g. lock up of a viscous clutch, a differential or modulating clutch to directly couple the primary and secondary drive lines.

In addition, it is known in the automotive industry to equip power transfer assemblies (ei.e. manual transmission, manual transmissions, transfer cases, etc.) with a shift system having spring shift devices for completing a delayed gear or mode shift once speed synchronization or a torque brake occurs. In most of the systems know in the related art, a pair of springs are used to provide a by-direction preload function for effectuating coupling of a dog-type shift sleeve with a desired gear set.

The devices known in the related art known as referenced above represent equally varying levels of complexity, sophistication, reliability and cost. Often times, a sophisticated system which provides rapid and precise selection of gears or operating modes falls short from a reliability standpoint. On the other hand, simple systems often do not provide positive, accurate or repeatable shifts although they are reliable.

Thus, there remains a need in the art for a shift actuator that is fast, efficient, relatively uncomplicated and inexpensive to manufacture.

SUMMARY OF THE INVENTION

The deficiencies in the related art are overcome in a shift actuator of the present invention that is employed to operatively engage and disengage associated gear sets in a transmission, transfer case or the like. The shift actuator includes a non-rotatable shift shaft that is axially moveable in rectilinear fashion between first and second positions. The shift shaft includes a pair of retaining surfaces disposed in spaced relationship with respect to each other on the shift shaft. A shift fork assembly is operatively mounted on the shift shaft and moveable between first and second positions. The shift fork assembly includes a housing and a shift fork connected to the housing for operatively engaging and disengaging the associated gear set. A biasing mechanism is disposed on the shift shaft in the housing and between the pair of retaining surfaces. The biasing mechanism is compressed between the retaining surfaces when the shift shaft is disposed in either of its first or second positions. The housing defines a retaining mechanism including a pair of cam surfaces disposed on opposite sides of the retaining mechanism. A holding pawl is biased into engagement with the retaining mechanism. The holding pawl includes a pair of holding surfaces that cooperate with the pair of cam surfaces for releasably engaging the pair of cam surfaces on the retaining mechanism. A solenoid assembly releasably engages the pawl when the shift shaft is disposed in its first position such that once the solenoid disengages the pawl the cam surfaces on the retaining mechanism cooperate with the holding surfaces on the pawl to drive the pawl out of engagement with the retaining mechanism thereby releasing the biasing force of the biasing mechanism to drive the housing and the shift fork axially on the shift shaft between engaged and disengaged positions with respect to the associated gear set.

The retaining mechanism including a pair of cam surfaces and a corresponding holding pawl allows the use of a much smaller release solenoid. The forces generated by the biasing mechanism to move the shift fork can be considerable. In the absence of the retaining mechanism and corresponding holding pawl, the release solenoid would not generate sufficient force to disengage the pawl or shift fork housing. The present invention provides for a shift actuator that may employ a much smaller solenoid assembly as well as providing very fast shift actuation once the solenoid has been released.

BRIEF DESCRIPTION OF THE DRAWINGS

Other objects, features and advantages of the present invention will be readily appreciated as the same becomes better understood after reading the subsequent description taken in connection with the accompanying drawings, wherein.

DETAILED DESCRIPTION OF THE EMBODIMENTS OF THE INVENTION

Figure 1:
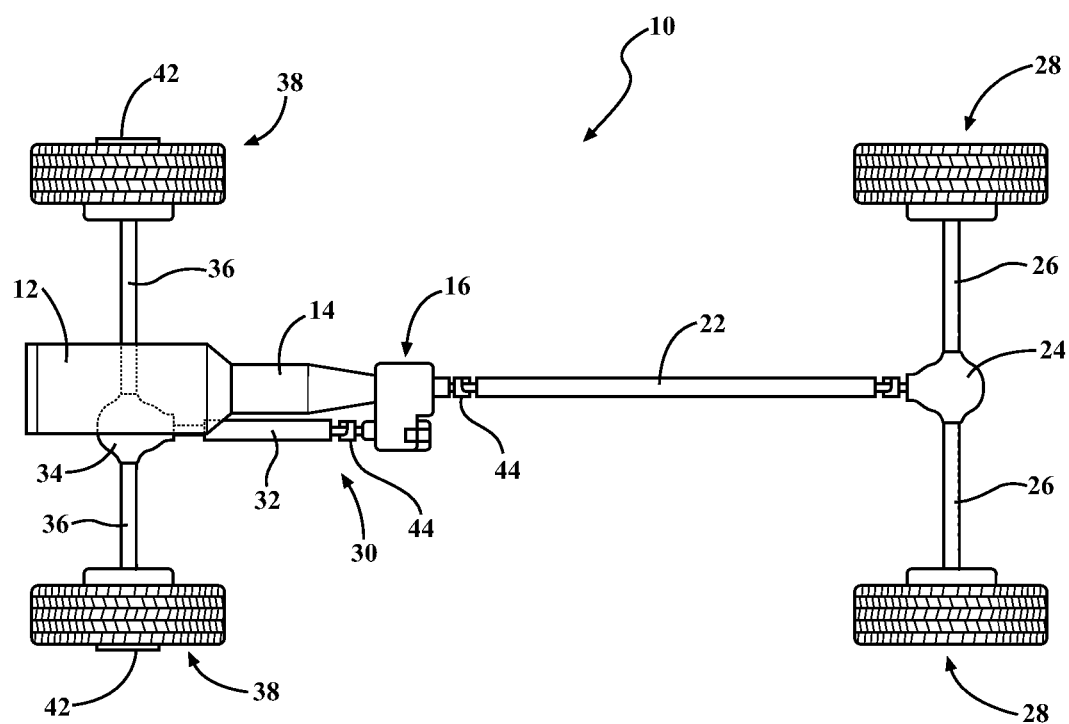
FIG. 1 is a schematic diagram of a drive train in which the shift actuator of the present invention may be employed.

Referring now to FIG. 1, where like numerals are used to designate like structures throughout the figures, a representative drive train for a four wheel drive vehicle is schematically illustrated and generally designated at 10. While the description that follows is made with reference to a drive train for a four wheel drive vehicle, those having ordinary skill in the art will appreciate that the present invention may be employed in drive trains other than those associated with four wheel drive. Nevertheless, as representatively depicted in FIG. 1, the drive train 10 includes a prime mover 12 which is coupled to a directly drives a transmission 14. The transmission 14 may be either an automatic or manual type.

The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 including a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activatable locking hubs 42 may be operatively disposed between the pair of front axles 36 and a respective one of the tire and wheel assemblies 38 to selectively connect same. Finally, both of the primary drive line 20 and the secondary drive line 30 may include suitable and appropriately disposed universal joints 44 which function in conventional fashion to allow static and dynamic offsets and misalignments between the various shafts and components.

The designations "primary" and "secondary" are utilized herein rather than "front" and "rear" in as much as the invention described and disclosed in herein may be readily utilized in transmissions, transfer cases, disconnect systems, or the like wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Each of the transmission, transfer case and other disconnect device or the like include gear sets used to select, and/or change the speed and torque of an associated output shaft. These associated gear sets may be disposed in an engaged position or in a disengaged/neutral position. The present invention is directed toward a shift actuator generally indicated at 50 in FIGS. 2-5 for operatively engaging and disengaging associated gear sets. The shift actuator 50 of the present invention includes a non-rotatable shift shaft generally indicated at 52 that is axially moveable in rectilinear fashion between first and second positions for reasons that will be explained in greater detail below. The shift shaft 52 includes a pair of retaining surfaces 54 disposed in spaced relationship with respect to each other on the shift shaft 52. In addition, the shift shaft includes at least one threaded portion 56.

The shift actuator 50 further includes a prime mover generally indicated at 58 and an axially constrained gear 60 mounted on the threaded portion 56 of the shift shaft 52 in driven relationship with the prime mover 58. A splined bushing, generally indicated at 62, is keyed to the housing of the transmission or transfer case as the case may be and prevents rotation of the shift shaft 52. The prime mover 58 acts to rotate the gear 60 to drive the shift shaft 52 in rectilinear fashion between the first and second positions. In the embodiment illustrated herein, the prime mover includes a reversible electric motor 58 having output shaft 64 and a pinion gear 66 mounted for rotation with the output shaft 64. The axially constrained gear 60 is disposed in meshing relationship with the pinion gear 66. The axially constrained gear 60 also includes internal threads that are disposed in meshing relationship with the threaded portion 56 of the shift shaft 52. In this way, actuation of the reversible electric motor 58 drives the pinion gear 66 which, in turn, drives the axially constrained gear 60 that, in turn, is in meshing relationship with the shift shaft 52. Rotation of the axially constrained gear 60 causes the shift shaft 52 to be moved in axially, in rectilinear motion between its first and second positions as will be described in greater detail below.

The shift actuator 50 of the present invention also includes a shift fork assembly, generally indicated at 68, that is operatively mounted on the shift shaft 52 and movable between corresponding first and second positions as described above. The shift fork assembly 68 includes a housing 70 and a shift fork 72 connected to the housing for operatively engaging and disengaging an associated gear set. To this end, the shift actuator 50 further includes a shift collar 74 operatively supported on the shift fork 72. The shift collar 74 is adapted to operatively engage and disengage the associated gear sets. A biasing mechanism 76 is disposed on the shift shaft 52 in the housing 70 and between the pair of retaining surfaces 54. In the embodiment disclosed herein, the retaining surfaces is a pair of flats 54 formed on the shift shaft 52. However, those having ordinary skill in the art will appreciate that any surface fixably disposed relative to the shift shaft will suffice for this purpose. The biasing mechanism 76 is compressed between the flats 54 of the retaining surfaces when the shift shaft 52 is disposed in either of its first of second positions. In the embodiment disclosed herein, the biasing mechanism is a coiled spring 76 that is entrained about the shift shaft 52. However, those having ordinary skill in the art will appreciate that any biasing mechanism suitable for the purpose described herein would be acceptable in this application. The shift fork housing 70 further includes a pair of c-clips 78 (FIGS. 4 and 5) disposed in spaced relationship with respect to each other and mounted on the shift shaft 52. The coiled spring 76 is disposed between the spaced c-clips 78.

Figure 2:
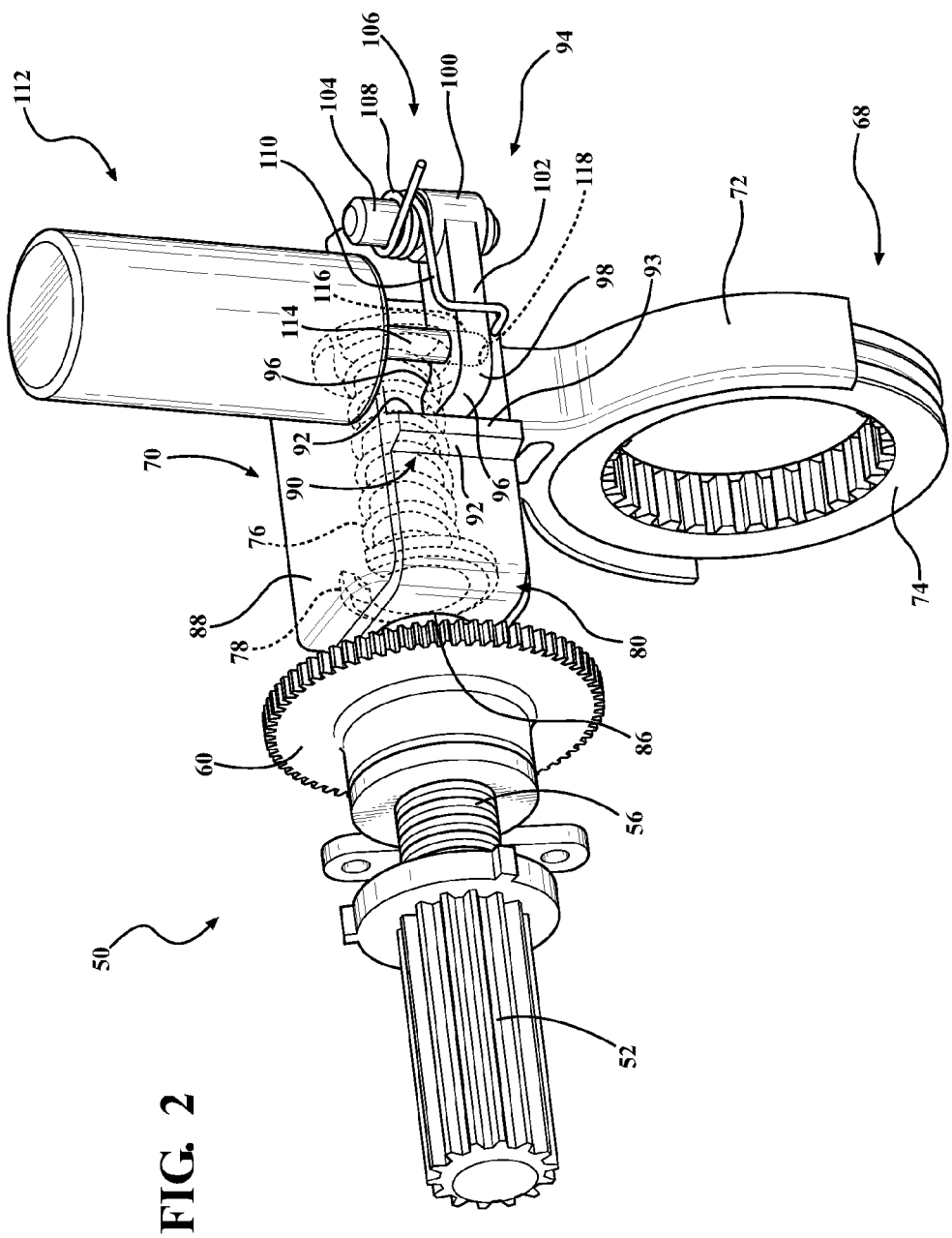
FIG. 2 is a perspective view of the shift actuator of the present invention.
Figure 3:
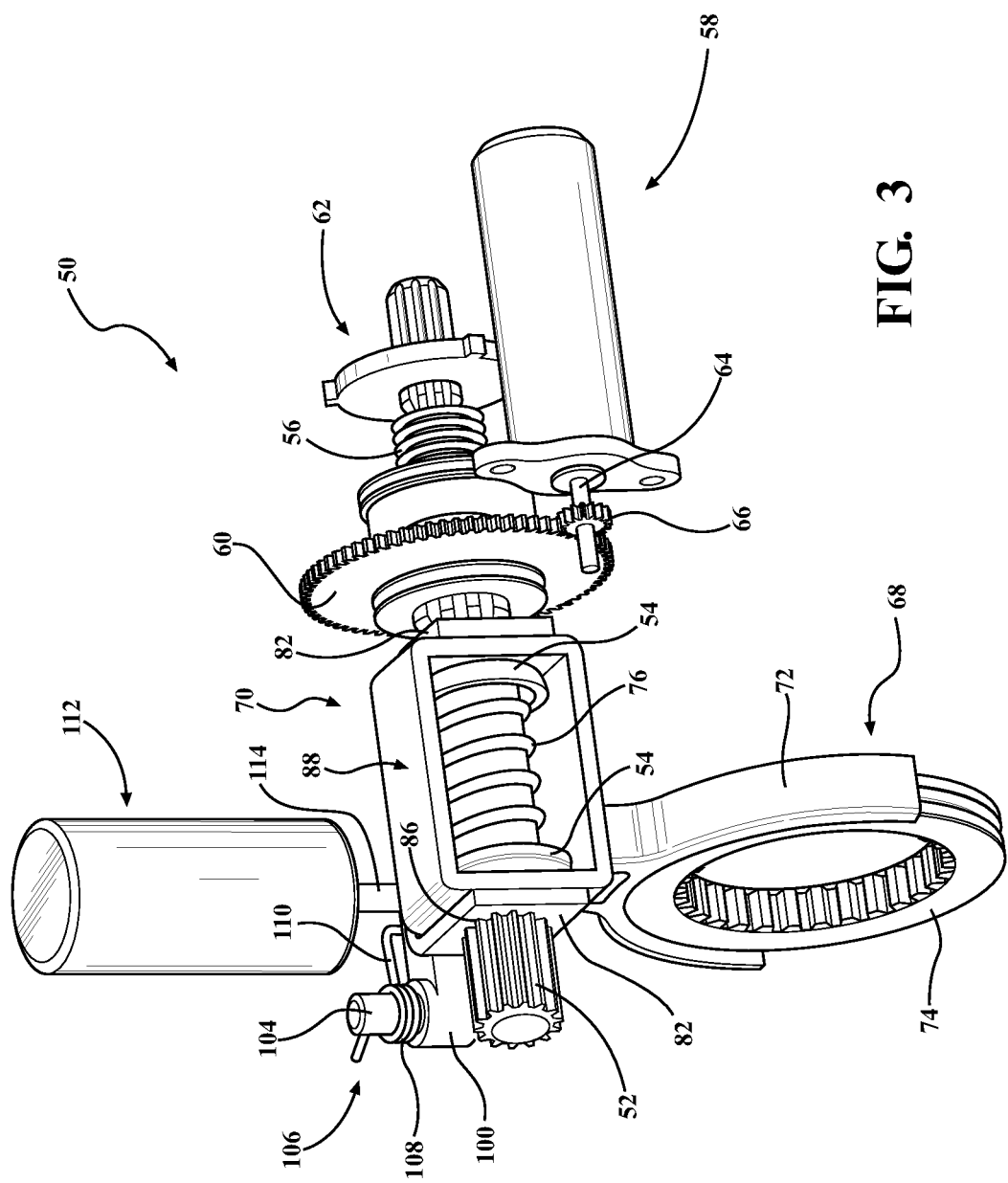
FIG. 3 is another perspective view of the shift actuator of the present invention illustrated without the yoke to show the cage of the shift fork housing and the biasing mechanism disposed about the shift shaft.
Figure 4:
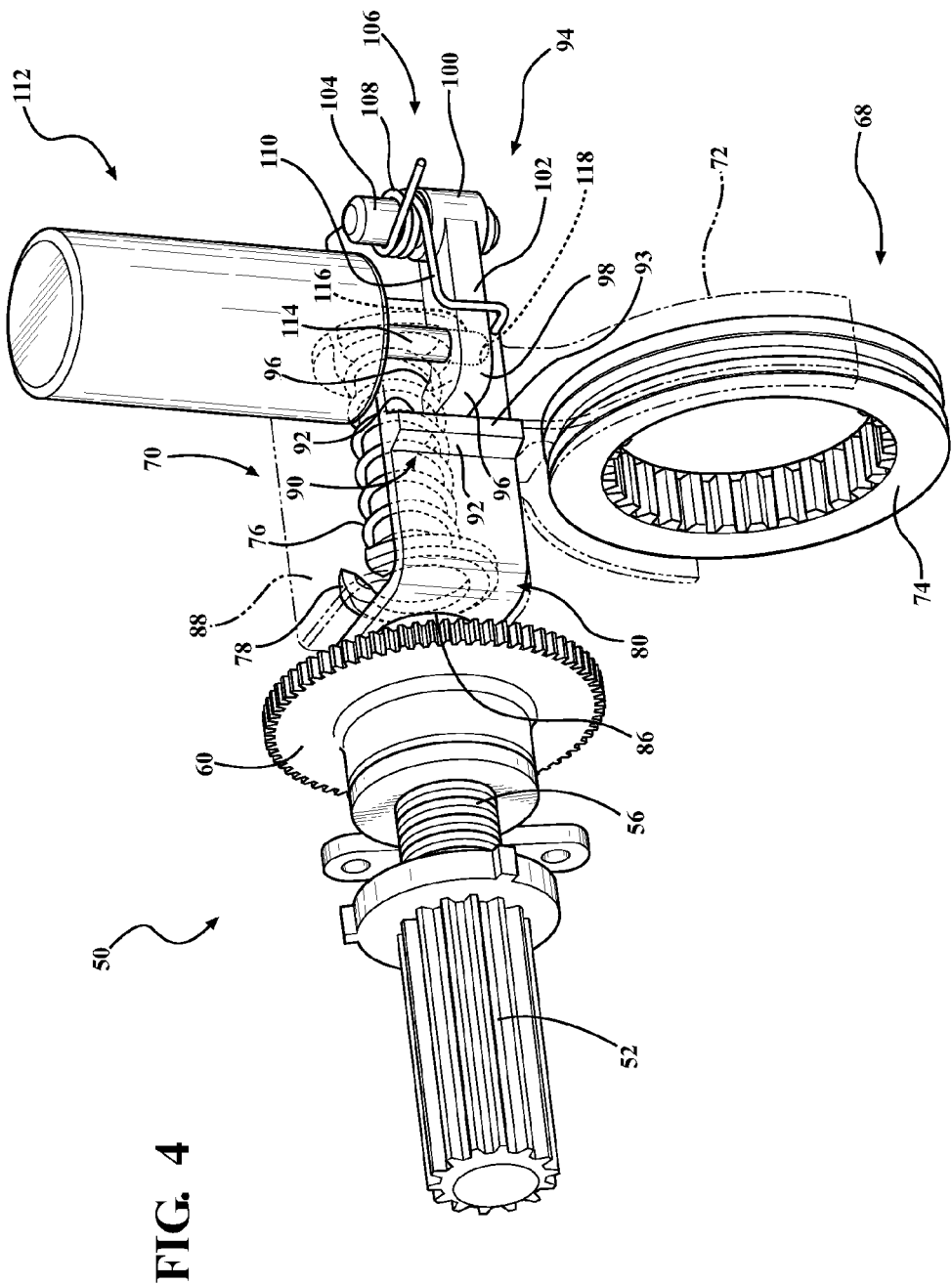
FIG. 4 is another perspective view of the shift actuator of the present invention illustrating the pawl engaged to one side of the cam of the retaining mechanism.
Figure 5:
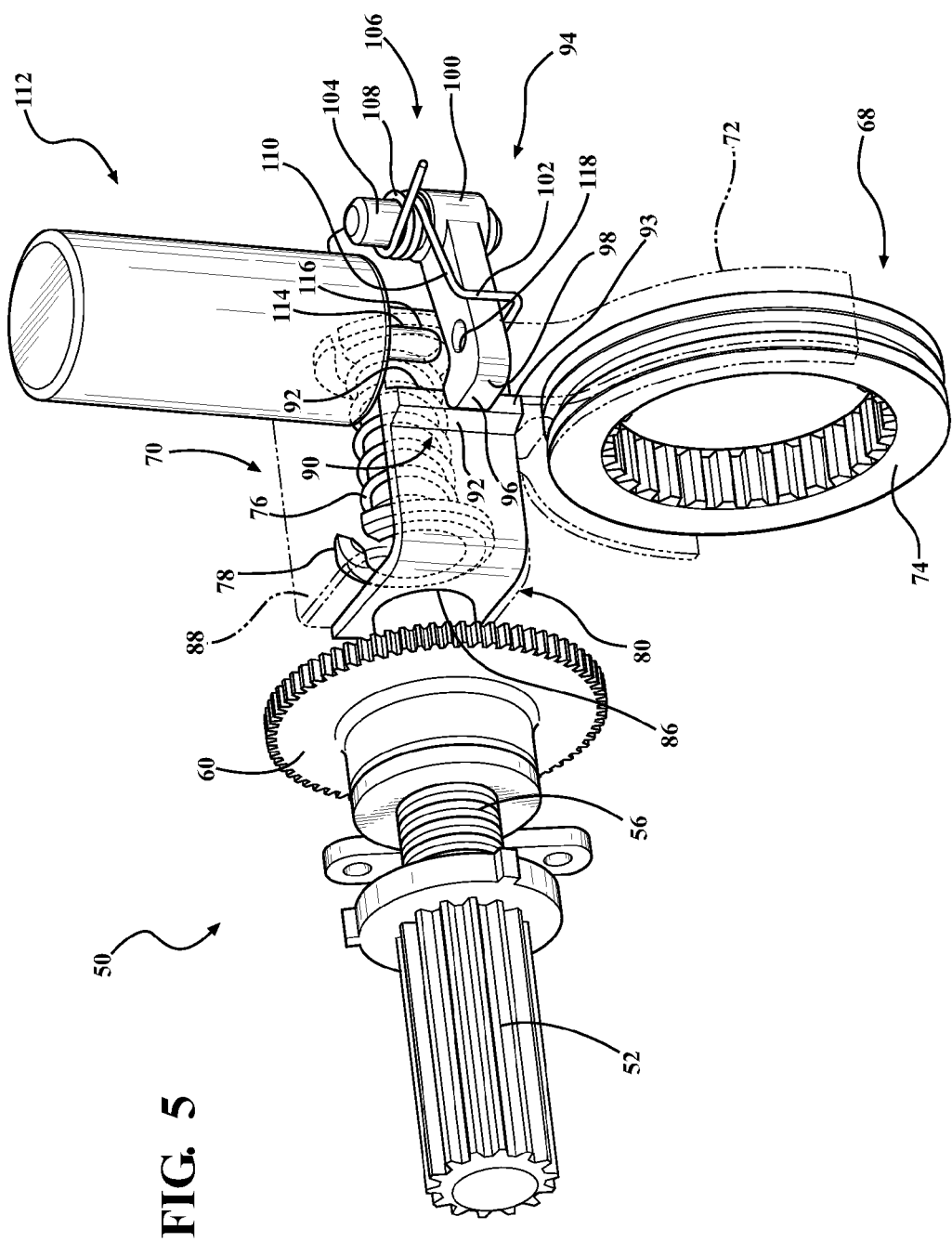
FIG. 5 is another perspective view of the shift actuator of the present invention showing the pawl in the disengaged position.

As best shown in FIGS. 2, 4 and 5, the shift fork housing 70 includes a yoke 80 having a pair of ears 82 and a deck 84 extending between the pair of ears 82. Each of the pair of ears 82 includes an aperture 86 aligned with respect to the other. The shift shaft 52 extends through the aligned apertures 86 disposed on the pair of ears 82. The housing 70 is operatively mounted to the shift shaft 52 at the pair of ears 82 so as to be movable rectilinear therewith. In addition, the shift fork housing 70 also includes a cage generally indicated at 88 in FIG. 3. The cage 88 cooperates with the yoke 80 to enclose the coiled spring 76 of the biasing mechanism disposed about the shift shaft 52.

The shift fork housing 70 also defines a retaining mechanism generally indicated at 90. The retaining mechanism 90 includes a pair of cam surfaces 92 disposed on opposite sides of the retaining mechanism 90 and a top surface 93 extending between and separating the cam surface 92. A holding pawl, generally indicated at 94, is biased into engagement with the retaining mechanism 90. The holding pawl 94 includes a pair of holding surfaces 96 for releasably engaging the pair of cam surfaces 92 on the retaining mechanism 90.

In the representative embodiment disclosed herein, the retaining mechanism includes a rib 90 that extends transversely to the direction of the rectilinear movement of the shift shaft 52. The pair of cam surfaces 92 are defined on opposite sides of the rib 90. The pawl 94 includes a head 98 and a base 100 with a body 102 extending therebetween. The pawl 94 is pivotable about a pin 104 extending through the base 100. The holding surfaces 96 are defined on opposite sides of the head 98 of the pawl 94. A biasing spring generally indicated of 106 having a coiled portion 108 is disposed about the pin 104. The biasing spring 106 also includes an arm 110 that engages the pawl 94 so as to bias the head 98 of the pawl 94 into engagement with the rib 90.

The shift actuator 50 of the present invention also includes a solenoid assembly generally indicated at 112. The solenoid assembly 112 releasably engages the pawl 94 when the shift shaft 52 is disposed in its first and second positions such that once the solenoid 112 disengages the pawl 94, the cam surfaces 92 on the retaining mechanism cooperate with the holding surfaces 96 on the pawl 94 to drive the pawl 94 out of engagement with the retaining mechanism 90 thereby releasing the biasing force of the biasing mechanism 76 to drive the housing 70 and the shift fork 72 axially on the shift shaft 52 between engaged and disengaged positions with respect to the associated gear set. The cam surfaces 92 on the retaining mechanism (rib 90) and the holding surfaces 96 on the pawl 94 are designed to resist the biasing force of the spring 76 when the solenoid 112 is engaged. However, in the absence of the holding force of the solenoid 112, the corresponding cam 92 and holding 96 surfaces act to drive the pawl 94 away from the rib 90 against the biasing force of the coiled spring 106. More specifically, when the solenoid 112 is disengaged, the holding surface 96 is designed and contoured to ride up the cam surface 92 of the rib 90 such that the head 98 of the pawl slideably engages the top surface 93 of the rib 90 before it falls and engages the opposite cam surface 92. To this end, as best shown in FIG. 5, the solenoid includes 112 a shaft 114 having a bullet shaped end 116 that is operatively received in a detent 118 formed on the body 102 of the pawl 94. The detent 118 may be in the form of an indentation formed on the body of the pawl. Alternatively, the detent may include an aperture that extends partially through or entirely through the body of the pawl.

After the pawl 94 has been moved out of engagement with the cam surfaces 92, and the shift fork has been moved from either its first or second positions under the influence of the biasing force of the coiled spring 76, the spring 106 acts to move the pawl 94 back into engagement with one or the other of the cam surfaces 92. In this position, the solenoid 112 reengages with the holding pawl 94 and the assembly 50 is ready to stage the next shift. When the solenoid 112 has been reengaged, the reversible electric motor 58 actuates to drive the pinion gear 66 which, in turn, drives the axially constrained gear 60. Because the threaded shift shaft 52 is restrained from rotating by the splined bushing 62, the shift shaft 52 begins translating axially to either its first or second position. Once either one of these positions has been reached, the spring 76 is compressed and the shift actuator 50 is staged for the next shift. In this disposition, the cam surfaces 92 on the rib 90 cooperate with the holding surface 96 on the pawl 94 to assist the solenoid 112 in maintaining the shift fork housing 70 in its first or second position, ready for the next shift event. These cooperating surfaces effectively take a significant portion of the load generated by the coiled spring 76. In so doing, this arrangement allows for the use of a much smaller solenoid assembly 112 because the solenoid is not required to resist the entire biasing force of the spring 76. At the same time, the spring loaded shift actuator assembly 50 of the present invention still allows very quick movement of the shift fork assembly 68 to effect changes between the associated gear sets.

The invention has been described in an illustrative manner. It is to be understood that the terminology which has been used is intended to be in the nature of words of description, rather than of limitation. Many modifications and variations of the invention are possible in light of the above teachings. Therefore, within the scope of the appended claims, the invention may be practiced other than as specifically described.

What is claimed is:

1. A shift actuator assembly for operatively engaging and disengaging associated gear sets, said shift actuator assembly comprising:
   a non-rotatable shift shaft that is axially movable in rectilinear fashion between first and second positions, said shift shaft including a pair of retaining surfaces disposed in space relationship with respect to each other on said shift shaft;
   a shift fork assembly operatively mounted on said shift shaft and movable between said first and second positions, said shift fork assembly including a housing and a shift fork connected to said housing for operatively engaging and disengaging the associated gear sets, a biasing mechanism disposed on said shift shaft in said housing and between said pair of retaining surfaces, said biasing mechanism being compressed between said retaining surfaces when said shift shaft is disposed in either of its first or second positions;
   said housing defining a retaining mechanism including a pair of cam surfaces disposed on opposite sides of said retaining mechanism, a holding pawl biased into engagement with said retaining mechanism, said holding pawl including a pair of holding surfaces for releasably engaging said pair of cam surfaces on said retaining mechanism;
   a solenoid assembly that releasably engages said pawl when said shift shaft is disposed in its first and second positions such that once said solenoid disengages said pawl, said cam surfaces on said retaining mechanism cooperate with said holding surfaces on said pawl to drive said pawl out of engagement with said retaining mechanism thereby releasing the biasing force of said biasing mechanism to drive said housing and said shift fork axially on said shift shaft between engaged and disengaged positions with respect to the associated gear set.

2. The shift actuator assembly as set forth in claim 1 wherein said shift fork housing includes a yoke having a pair of ears and a deck extending between said pair of ears, each of said pair of ears including an aperture aligned with respect to the other, said shift shaft extending through said aligned apertures disposed on said pair of ears, said housing operatively mounted to said shift shaft at said pair of ears so as to be movable rectilinear therewith.

3. The shift actuator assembly as set forth in claim 2 wherein shift fork housing further includes a cage, said cage cooperative with said yoke to enclose said biasing mechanism disposed about said shift shaft.

4. The shift actuator assembly as set forth in claim 1 wherein said biasing mechanism is a coiled spring entrained about said shift shaft.

5. The shift actuator assembly as set forth in claim 4 wherein said shift fork housing further includes a pair of C-clips disposed in space relationship with respect to each other and mounted to said shift shaft, said coiled spring disposed between said spaced C-clips.

6. The shift actuator assembly as set forth in claim 1 wherein said retaining mechanism includes a rib extending transversely to the direction of rectilinear movement of said shift shaft, said pair of cam surfaces disposed on opposite sides of said rib.

7. The shift actuator assembly as set forth in claim 1 wherein said pawl includes a head and a base, said pawl being pivotal about a pin extending through said base, said holding surfaces being disposed on opposite sides of said head of said pawl.

8. The shift actuator assembly as set forth in claim 7 wherein said shift actuator further includes a biasing spring having a coiled section disposed about said pin and an arm engaging said pawl so as to bias said head of said pawl into engagement with said rib.

9. The shift actuator assembly as set forth in claim 1 wherein said shift actuator further includes a shift collar operatively supported on said shift fork, said shift collar adapted to operatively engage and disengage the associated gear sets.

10. The shift actuator assembly as set forth in claim 1 wherein said shift shaft includes at least one threaded portion and said shift actuator further includes a prime mover and an axially constrained gear mounted on said at least one threaded portion of said shift shaft in driven relationship with said prime mover, said prime mover acting to rotate said gear to drive said shift shaft in rectilinear fashion between said first and second positions.

11. The shift actuator assembly as set forth in claim 10 wherein said prime mover includes a reversible electric motor having an output shaft, a pinion gear monitored for rotation with said output shaft, said axially constrained gear being disposed in meshing relationship with said pinion gear and further including internal threads disposed in meshing relationship with said at least one threaded portion of said shift shaft.

12. An automotive transmission having at least one of gear set and at least one shift actuator assembly for operatively engaging and disengaging an associated gear set, said automatic transmission comprising:
  a shift actuator assembly having a non-rotatable shift shaft that is axially movable in rectilinear fashion between first and second positions, said shift shaft including a pair of retaining surfaces disposed in space relationship with respect to each other on said shift shaft;
  a shift fork assembly operatively mounted on said shift shaft and movable between said first and second positions, said shift fork assembly including a housing and a shift fork connected to said housing for operatively engaging and disengaging the associated gear sets, a biasing mechanism disposed on said shift shaft in said housing and between said pair of retaining surfaces, said biasing mechanism being compressed between said retaining surfaces when said shift shaft is disposed in either of its first or second positions;
  said housing defining a retaining mechanism including a pair of cam surfaces disposed on opposite sides of said retaining mechanism, a holding pawl biased into engagement with said retaining mechanism, said holding pawl including a pair of holding surfaces for releasably engaging said pair of cam surfaces on said retaining mechanism;
  a solenoid assembly that releasably engages said housing when said shift shaft is disposed in its first and second positions such that once said solenoid disengages said housing, said cam surfaces on said retaining mechanism cooperate with said holding surfaces on said pawl to drive said pawl out of engagement with said retaining mechanism thereby releasing the biasing force of said biasing mechanism to drive said housing and said shift fork axially on said shift shaft between engaged and disengaged positions with respect to the associated gear set.

13. The automatic transmission as set forth in claim 12 wherein said shift fork housing includes a yoke having a pair of ears and a deck extending between said pair of ears, each of said pair of ears including an aperture aligned with respect to the other, said shift shaft extending through said aligned apertures disposed on said pair of ears, said housing operatively mounted to said shift shaft at said pair of ears so as to be movable rectilinear therewith.

14. The automatic transmission as set forth in claim 12 wherein said retaining mechanism includes a rib extending transversely to the direction of rectilinear movement of said shift shaft, said pair of cam surfaces disposed on opposite sides of said rib.

15. The automatic transmission as set forth in claim 12 wherein said pawl includes a head and a base, said pawl being pivotal about a pin extending through said base, said holding surfaces being disposed on opposite sides of said head of said pawl.

16. The automatic transmission as set forth in claim 15 wherein said shift actuator further includes a biasing spring having a coiled section disposed about said pin and an arm engaging said pawl so as to bias said head of said pawl into engagement with said rib.

17. A transfer case having at least one of gear set and at least one shift actuator assembly for operatively engaging and disengaging an associated gear set, said transfer case comprising:
  a shift actuator assembly having a non-rotatable shift shaft that is axially movable in rectilinear fashion between first and second positions, said shift shaft including a pair of retaining surfaces disposed in space relationship with respect to each other on said shift shaft;
  a shift fork assembly operatively mounted on said shift shaft and movable between said first and second positions, said shift fork assembly including a housing and a shift fork connected to said housing for operatively engaging and disengaging the associated gear sets, a biasing mechanism disposed on said shift shaft in said housing and between said pair of retaining surfaces, said biasing mechanism being compressed between said retaining surfaces when said shift shaft is disposed in either of its first or second positions;
  said housing defining a retaining mechanism including a pair of cam surfaces disposed on opposite sides of said retaining mechanism, a holding pawl biased into engagement with said retaining mechanism, said holding pawl including a pair of holding surfaces for releasably engaging said pair of cam surfaces on said retaining mechanism;
  a solenoid assembly that releasably engages said housing when said shift shaft is disposed in its first and second positions such that once said solenoid disengages said housing, said cam surfaces on said retaining mechanism cooperate with said holding surfaces on said pawl to drive said pawl out of engagement with said retaining mechanism thereby releasing the biasing force of said biasing mechanism to drive said housing and said shift fork axially on said shift shaft between engaged and disengaged positions with respect to the associated gear set.

18. The transfer case as set forth in claim 17 wherein said retaining mechanism includes a rib extending transversely to the direction of rectilinear movement of said shift shaft, said pair of cam surfaces disposed on opposite sides of said rib.

19. The transfer case as set forth in claim 17 wherein said pawl includes a head and a base, said pawl being pivotal about a pin extending through said base, said holding surfaces being disposed on opposite sides of said head of said pawl.

20. The transfer case as set forth in claim 19 wherein said shift actuator further includes a biasing spring having a coiled section disposed about said pin and an arm engaging said pawl so as to bias said head of said pawl into engagement with said rib.

* * * * *